United States Patent [19]
Allen

[11] 3,890,470

[45] June 17, 1975

[54] MEASUREMENT OF NOISE IN A COMMUNICATION CHANNEL

[75] Inventor: Edgar Robert Allen, Stanmore, England

[73] Assignee: The Post Office, London, England

[22] Filed: Dec. 11, 1973

[21] Appl. No.: 423,809

[30] Foreign Application Priority Data

Dec. 14, 1972 United Kingdom ............... 57639/72

[52] U.S. Cl. ............................ 179/15 BF; 324/57 N

[51] Int. Cl. ................................................ H04j 1/16

[58] Field of Search ................. 179/15 BF, 175.3 R; 324/57 N; 325/67, 133, 363

[56] References Cited

UNITED STATES PATENTS

| | | | |
|---|---|---|---|
| 2,987,586 | 6/1961 | Berger | 324/57 N |
| 3,683,282 | 8/1972 | D'Amato | 324/57 N |
| 3,774,113 | 11/1973 | Chasek | 325/363 |
| 3,775,689 | 11/1973 | Greenwald | 179/15 BF |
| 3,794,999 | 2/1974 | Gellekink | 325/363 |

*Primary Examiner*—David L. Stewart
*Attorney, Agent, or Firm*—Kemon, Palmer & Estabrook

[57] ABSTRACT

The present invention measures the NPR of a frequency multiplex system by measuring a selected bandwidth of the system using the actual intermodulation and thermal interference noise in the selected band when the multi-channel system, excluding the selected band is in traffic. The method of the present invention does not measure the true NPR of the band as defined but provides an approximation which is adequate for practical purposes.

8 Claims, 1 Drawing Figure

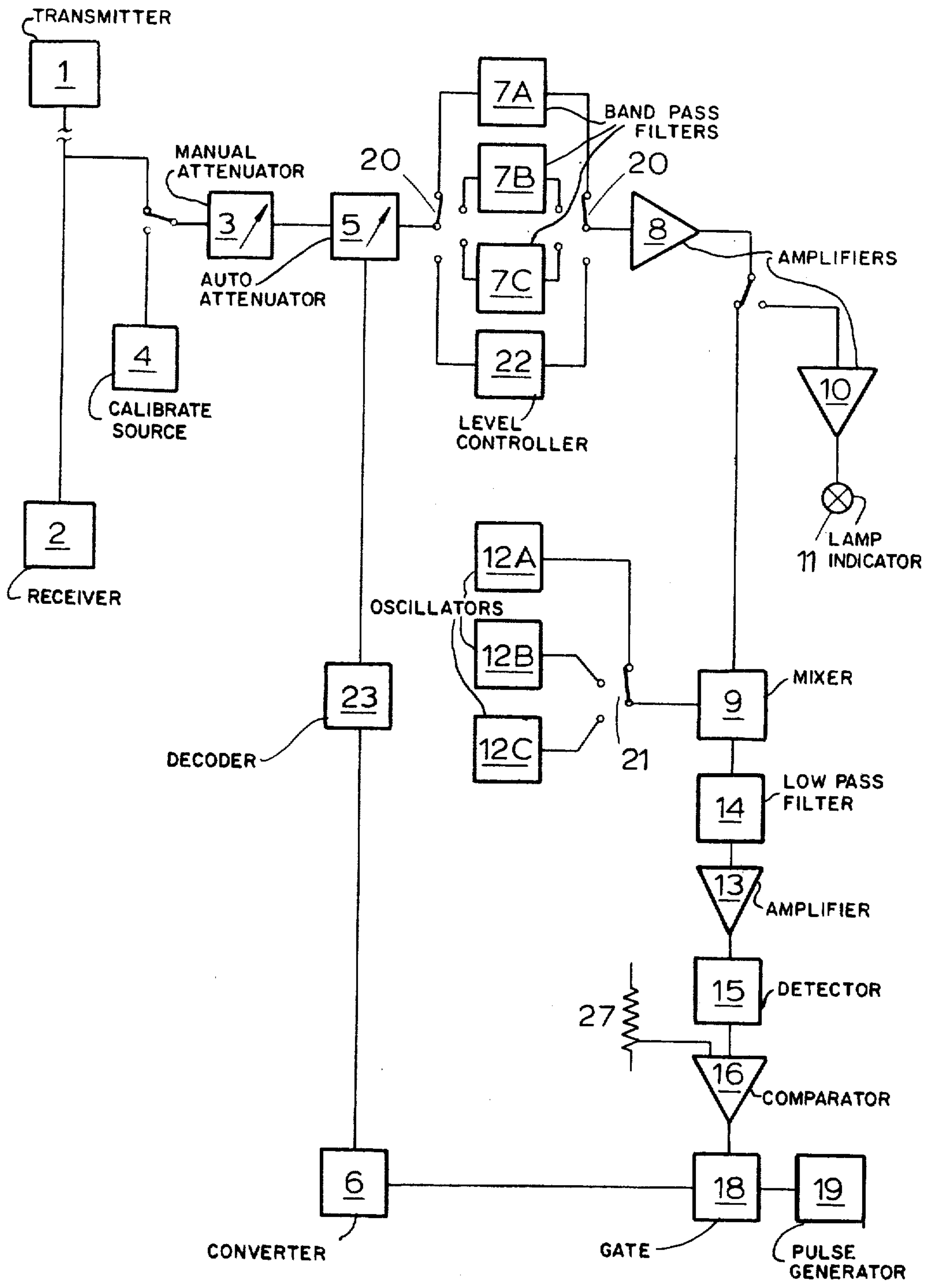
TRANSMITTER
1
2
RECEIVER
MANUAL ATTENUATOR
3
AUTO ATTENUATOR
5
4
CALIBRATE SOURCE
20
7A
7B
7C
22
BAND PASS FILTERS
20
LEVEL CONTROLLER
8
AMPLIFIERS
10
LAMP INDICATOR
11
12A
12B
12C
OSCILLATORS
21
9
MIXER
14
LOW PASS FILTER
13
AMPLIFIER
15
DETECTOR
27
16
COMPARATOR
23
DECODER
6
CONVERTER
18
GATE
19
PULSE GENERATOR

MEASUREMENT OF NOISE IN A COMMUNICATION CHANNEL

This invention relates to a method of and apparatus for measuring the noise power (NPR) of a communication channel, said channel being one of a plurality of such channels in a frequency multiplex system.

The term noise power ratio will be defined presently.

Frequency division multiplex cable and radio systems may carry 2,000 or more different telephone channels typically with a 4 KHz spacing in a total bandwidth of approximately 12.5 MHz.

In such systems, it is essential that intermodulation noise due to telephone traffic and inherent noise due, for example, to thermal interference in any channel is minimised. The former is produced mainly by non-linearity and phase distortion and is audible to a subscriber as interference resembling random noise. Higher frequencies are more sensitive to phase distortion in the radio frequency and intermediate frequency ranges; mixer frequency components (crossover distortion) are most noticeable at middle frequencies; and non-linearity is apparent at low frequencies. These effects become more marked as the number of channels increases.

If such noise is at a low level compared with the intelligence signal then it is not troublesome and can be ignored. However as the noise level increases, the intelligence signal clarity will be reduced. A useful parameter in assessing the condition of a particular channel of a multiplex system is termed the noise power ratio and is herein defined as the ratio of intelligence signal plus unwanted noise in a narrow bandwidth of a multi-channel system to the noise in the same bandwidth when intelligence signals are not applied in that band but are applied over the remainder of the multi-channel system.

A method used in the past for measuring the NPR of a channel of a system utilises white noise, i.e. random noise of uniform frequency distribution. A white noise generator is set to pass white noise through the system at a level recommended by the CCIR (International Radio Consultative Committee) as simulating the traffic in the system when the system is fully loaded. The output of the system is connected to a noise receiver which is tuned to the frequency of the channel selected for NPR measurement.

The sensitivity of the receiver is adjusted to give a predetermined meter reading when a receiver input attenuator is set to approximately maximum attenuation. A band-stop filter is then interposed between the white noise source and the system, the band-stop filter being adapted to cut out the white noise signal in the selected channel. There remains in the channel only noise due to intermodulation and thermal interference effects. This is measured at the receiver by adjusting the receiver input attenuator to restore the original meter deflection. The difference between the initial and final attenuator settings in decibels is the NPR of the channel and gives a measure of the amount of intermodulation and thermal interference noise produced in the selected channel.

One disadvantage of this method is that the NPR obtained is an idealised value, since the broad band white noise used is not a true representation of signal traffic in the system at peak loading of the system. The discrepancy between the idealised and actual values of intelligence signal levels prevailing in a channel does not appreciably affect the NPR figure, since the intelligence signal level is very much greater than the intermodulation and thermal interference noise level. As a corollary, however, any discrepancy between the idealised and actual values of intermodulation and thermal interference noise levels appreciably affects the NPR figure.

Another disadvantage of the method described is that the complete system must be removed from traffic to enable measurement of NPR to be made. Such removal is costly and could lead to delays.

The present invention seeks to overcome these disadvantages by measuring the NPR of a selected bandwidth of the system using the actual intermodulation and thermal interference noise in the selected band when the multi-channel system, excluding the selected band is in traffic. It will be appreciated that the method of the present invention does not measure the true NPR of the band as defined but provides an approximation which is adequate for practical purposes.

According to one aspect of the invention there is provided apparatus for measuring the NPR of a selected frequency band in a plurality of communication channels of a frequency multiplex system when said band is devoid of intelligence signal, said apparatus comprising:

connecting means for extracting a broad band signal from the system when the system is in traffic;

setting means for setting the overall level of said broad band signal to a present signal reference level;

a band pass filter adapted to pass said selected band;

a comparator having a first input terminal and a second input terminal and an output terminal and, in use, having a predetermined reference voltage related to said preset signal reference level applied to its first input terminal, its second input terminal being adapted to receive a derived signal related to the power of the signal at the output of said filter;

level control feedback means coupled to the comparator output terminal to alter the relative magnitude level of the signals applied to the input terminals of the comparator until the comparator output is zero; and read out means coupled to the output terminal of the comparator and arranged to indicate, as the NPR the relative alteration in the signal levels applied to the first and second input terminals of the comparator to produce said zero output.

Preferably said selected bandwidth is substantially equal to the bandwidth of one communication channel of the system.

Preferably said read out means includes a pulse generator, a gate and a counter and display means the output from said pulse generator being arranged to be applied to said counter and display means via said gate only when the output from said comparator is not zero.

Preferably the setting means includes a manually operable first attenuator, and the feedback means is coupled to a second attenuator arranged to reduce the attenuation applied to the derived signal applied to the second input terminal of the comparator.

According to another aspect of the invention there is provided a method of measuring the NPR of a selected band consisting of one channel of a plurality of communication channel in a frequency multiplex system when said selected channel is devoid of intelligence signal, said method comprising the steps of:

generating a calibrating signal having a uniform frequency distribution across the same frequency spectrum as said multiplex system;

adjusting the output power the calibrating signal to a preset value;

filtering from the calibrating signal those frequencies lying within said selected channel;

applying a signal derived from the filtered signal to a first input of a comparator means;

setting a reference voltage applied to a second input of the comparator to a predetermined reference voltage at which the output from the comparator is zero;

removing said calibrating signal;

extracting a broad band signal from the system when the system is in traffic;

setting the power level of said broad band signal to said preset value;

filtering from the broad band signal those frequencies lying within said selected channel;

applying those filtered frequencies to the first input of the comparator;

utilizing the comparator to compare the magnitudes of the comparator inputs; varying the magnitude of the signal applied to one of said inputs of the comparator; and measuring the variation in magnitude required to produce zero output from the comparator.

According to a further aspect of the invention there is provided a method of measuring the NPR of a selected band consisting of one channel of a plurality of communication channels in a frequency multiplex system when said selected channel is devoid of intelligence signal said method comprising the steps of:

extracting a broad band signal from the system when the system is in traffic;

setting the power level of said broad band signal to a preset power level;

passing said broad band signal at said preset level to a narrow band-pass filter adapted to pass a bandwidth contained within said selected channel;

passing a signal derived from the output of said filter to a second input terminal of a comparator having a predetermined reference voltage related to said preset power level applied to its first input terminal;

varying the magnitude of the signal applied to one of said inputs of the comparator; and measuring the variation in magnitude required to produce zero output from the comparator.

In one embodiment of the method of the invention, the selected channel is made devoid of intelligence signal by means within the frequency multiplex system.

In another embodiment of the method of the invention measurement is made in gaps in the intelligence signal on the selected channel which is in traffic.

The first of these methods is preferable since additional equipment connected to either end of the channel is made unnecessary. In the second method, inherent noise on the additional equipment, for example, telephone lines from subscribers local equipment connected to the channel, can produce an error in the NPR measured.

In the second method, the connecting means of the apparatus may include a switch arranged to be operated to the closed position when the selected band is devoid of intelligence signal. Sensing means can also be provided for sensing gaps in the intelligence signal and, thereupon operating the switch to the closed position.

Control means may also be provided for operating the switch to the open position on detection by the control means of the zero at the comparator output.

An embodiment of the invention will now be described by way of example, with reference to the accompanying drawing which shows a block schematic diagram of apparatus for use in a method of measuring the NPR of three selected channels of a multi-channel system.

Referring to the drawing in detail, there is shown a multi-channel system having a multi-signal input 1 and a multi-signal output 2 to measuring apparatus 3–23. The system is, for example, a frequency multiplex system having 1800 channels of typically 4 KHz spacing.

Preferably, the frequencies of the three selected channels are those set by the CCIR (International Radio Consultative Committee) for the system under test; i.e. 534 KHz, 3886 KHz and 7602 KHz for an 1800 channel system. It will be appreciated that the figures given are in the lower, middle and upper frequency ranges respectively of the 1800 channel system. The NPR's of channels of the system other than those for which NPR measurements are actually made can be estimated by interpolation.

A broad band traffic signal sample is taken from the multi-channel system when the system is in traffic and is fed to a manual attenuator 3.

At the manual attenuator, the broad band signal is attenuated to a preset signal reference level. A calibration circuit used to fix this level will be described later.

The output from the manual attentuator is fed to an auto attenuator 5 whose attenuation is automatically controlled by the output of a counter 6, the attenuation being at a maximum in the absence of any control signal from the counter.

The auto attenuator output is fed via one of a series of band-pass filters 7A, 7B or 7C to an amplifier 8. The band-pass filters are each set to pass a bandwidth of 4 KHz which corresponds to the bandwidth of one communication channel. The filters are typically crystal filters, although any filter having an accurately defined cut-off could be utilised.

The filter corresponding to the particular channel selected for NPR measurement is switched into the circuit by operating an appropriate pair of ganged switches 20. The ganged switches 20 are linked to switches 21 whereby one of a series of oscillators 12A, 12B or 12C, corresponding to filters 7A, 7B, 7C respectively is switched into the measuring circuit. Thus, for example, when filter 7A is switched into the circuit, oscillator 12A is also switched in.

The output from the selected filter is fed to a 40 dB amplifier 8, the amplifier 8 having a band width of from 50 KHz to 10 MHz so as to include the frequency bands passed by all of the filters 7. The resulting narrow band signal from the amplifier is passed to a mixer 9. At the mixer 9 the signal is mixed with a signal from the corresponding oscillator 12. The oscillators 12 are of the crystal control type and each one is set to oscillate at the centre frequency of its corresponding band-pass filter. The narrow band signal and the oscillatory signal, when mixed, produce a signal having components including the sum, difference and side band frequencies of the two input signals. In the difference frequency component of the signal, the centre frequency is cancelled to leave only the side band frequencies of the two input signals. These range in frequency from 10 to 2000 Hz and contain a predetermined portion of the noise originally present in the narrow band signal from the filter.

The output from the mixer 9 is fed through a 1.1 KHz low pass active filter 14 to a 70 dB low frequency amplifier 13.

The low pass filter 14 is included in the measuring circuit because of a recommendation by the CCIR that the NPR of a particular channel be declared using a total effective bandwidth of 2.2 KHz. Since the output of the mixer 9 as amplified by the 70 dB amplifier 13 is a double side band signal then to obtain an effective bandwidth of 2.2 KHz, the signal must be limited to a 1.1 KHz top frequency to allow for foldover of the lower side band. The centre frequency of the low-pass filter 14 may be set to exclude any carrier frequency components in the selected channel content.

The output from the amplifier 13 is passed through a detector 15 to a first input of a differential input comparator 16. A reference voltage, predetermined in a manner to be described later is applied to the second input of the comparator 16 from a voltage generator 27.

The output from the comparator 16 is fed to a gate 18 which is closed when the comparator output is zero but is open as long as the comparator output is non-zero. While the gate 18 is open, a pulse sequence is allowed to pass from a pulse generator 19 to the digital counter 6 which has a digital display associated therewith. An output from the counter is fed back through a coding circuit 23 to the auto attenuator 5 to provide a stepwise reduction in the attenuation of the incoming broad band signal, each step producing an increase in the signal level of 1 dB and corresponding to a pulse received by the counter 6 from the pulse generator 19.

The NPR for the selected channel can then be read directly from the digital display.

The apparatus may alternatively be arranged to produce a first large step of attenuation reduction and a corresponding change in displayed count, followed by several consecutive substantially equal smaller steps. In another embodiment of the invention, instead of the comparator output being used to alter the level of the broadband signal before its passage through the filter 7 to the comparator first input, the comparator output may be used to produce a stepwise reduction of the voltage applied at the comparator second input from the voltage generator 27, the magnitude of each voltage reduction corresponding to a 1dB increase in the level of the broadband signal output from the manual attenuator. The coding circuit and the auto attenuator would then not be necessary.

Before the receiver is used in the method of the invention, it must first be calibrated. To calibrate the receiver a calibrating signal is generated at a source 4. The calibrating signal comprises uniform spectrum random noise at said preset level and covering the frequency spectrum of the system.

The calibrating signal is fed through the attenuator 3 and the attenuator 5, which is set at maximum attenuation, to a level preset control 22 adapted to give a loss of signal level equivalent to the loss of level experienced by a broad band traffic signal in passing through one of the filters 7. The signal from the level preset control 22 is amplified at the amplifier 8 and, after detection and further amplification at 10, is fed to a lamp indicator 11. The values of the measuring circuit components are adjusted so that the lamp indicator just lights when the signal is applied.

The lamp indicator is then switched out of the circuit by switching the output from the 40 dB amplifier 8 to the mixer 9 after operating the ganged switches 20 and 21 to pass the calibrating signal through one of the filters 7.

The output of the amplifier 8, after passage through the mixer 9, the low-pass active filter 14 the amplifier 13 and the detector 15 is then applied to one input of the comparator 16. A reference voltage is applied to the other input of the comparator from the voltage generator 27, the reference voltage being so adjusted as to zero the comparator output.

The calibrating signal is then switched out of the circuit, the measuring apparatus then being in a condition suitable for use in the measurement of NPR.

Clearly the measuring apparatus can be constructed and calibrated for use with other systems. This would necessitate the inclusion of other filters 7 and oscillators 12. In addition the apparatus must have a preset signal reference level appropriate to such other systems.

With the method and apparatus of the invention, the NPR of any selected channel can be measured and given as a function of the traffic loading on the system. Ideally, the NPR of the selected channel should be measured when all the other channels of the system are in traffic, i.e. fully loaded, so as to indicate the condition of the channel as an integral part of the system. In practice, such loading rarely occurs and in the preferred embodiment described, would never happen since three of the channels are permanently free of traffic to allow for measurement of NPR of a selected channel could readily be measured in a substantially fully loaded system by making a NPR measurement while uniform spectrum random noise at a level appropriate to the system is being passed along those channels known to be free of traffic.

A list of specifications or sources of components which can be used in the construction of an NPR measuring circuit for performing the method of the invention is set out below.

The components listed refer to the reference numerals of the drawing.

| | | |
|---|---|---|
| 4 | Marconi Instruments | TF 2091B |
| 5 | Texcan Corporation | PA 71 |
| 6 | Texas Instruments Ltd. | SN 7493 |
| 7 | Marconi Instruments | TM 9503/2 |
| 8 | Texas Instruments | SN 7510L |
| 11 | Indicator Lamp — | Burndett Ltd. |
| 16 | Texas Instruments | SN 741N |
| 18 | Texas Instruments | SN 7400N |
| 19 | Texas Instruments | SN 74121N |
| 20 | Link Switches — | Telephone Manufacturing Company |
| 5 | Attenuator resistances — | Welwyn Resistors Ltd. |
| 27 | Voltage generator — | Morganite Potentiometers |

Other details of the circuit construction will be apparent to those skilled in the art.

I claim:

1. A NPR measuring apparatus for measuring the NPR of a selected channel in a frequency multiplex transmission system said apparatus comprising:

tapping means for extracting a broad band signal from said frequency multiplex transmission system;

incrementally variable attenuator means connected to an output of said tapping means;

filter means for isolating a frequency band within said channel;

first switch means for connecting an output of said attenuator means and a selected input of said filter means;

oscillator means for generating a signal having a frequency equal to the center frequency of said frequency band;

mixer means having a first input connected to an output of said oscillator means, a second input and an output;

second switch means connected between an output of said filter means and said second input of said mixer means;

broad band level preset means connected between said first switch means and said second switch means;

detector means connected to an output of said mixer means;

comparator means having a first input connected to an output of said detector means, a second input and an output;

reference voltage means connected to said second input of said comparator means; and digital drive means connected to the output of said comparator means, an output of said digital drive means connected to a control terminal of said incrementally variable attenuator.

2. An NPR measuring apparatus as claimed in claim 1 wherein said digital drive means comprises:

gate means having an input, an output, and a control terminal connected to the output of said comparator means;

a clock pulse generator connected to the input of said gate means;

a counter, having display means, connected to the output of said gate means; and decoder means connected between said counter means and the control terminal of said incrementally variable attenuator means.

3. A NPR measuring apparatus as claimed in claim 2 wherein said filter means comprises a plurality of band pass filters each of which can be connected between said incrementally variable attenuator means and said mixer means by said first and second switch means; said oscillator means comprises a plurality of oscillators each of which can be connected via a third switch means to said first input of said mixer means; and said first, second and third switch means being ganged together.

4. A NPR measuring apparatus as claimed in claim 3 including a second variable attenuator means connected in series with said incrementally variable attenuator means, between said tapping means and said first switch means.

5. A NPR measuring apparatus as claimed in claim 4 including low pass filter means connected between said mixer means and said detector means.

6. A NPR measuring apparatus as claimed in claim 5 including a high gain amplifier connected between said second switch means and said mixer means.

7. A NPR measuring apparatus as claimed in claim 6 including a claibration indicator connected via amplifier means and fourth switch means to an input of said high gain amplifier.

8. A NPR measuring apparatus as claimed in claim 7 wherein said incrementally variable attenuator has an attenuation which changes in unequal increments, an initial increment being greater than subsequent increments.

* * * * *